United States Patent
Hotelling et al.

(10) Patent No.: US 8,144,129 B2
(45) Date of Patent: Mar. 27, 2012

(54) FLEXIBLE TOUCH SENSING CIRCUITS

(75) Inventors: Steve Porter Hotelling, San Jose, CA (US); Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1186 days.

(21) Appl. No.: 11/818,499

(22) Filed: Jun. 13, 2007

(65) Prior Publication Data

US 2008/0309634 A1 Dec. 18, 2008

Related U.S. Application Data

(63) Continuation-in-part of application No. 11/818,466, filed on Jun. 13, 2007.

(60) Provisional application No. 60/878,828, filed on Jan. 5, 2007.

(51) Int. Cl.
G06F 3/041 (2006.01)
(52) U.S. Cl. .................................. 345/174; 345/173
(58) Field of Classification Search .................. None
See application file for complete search history.

(56) References Cited

U.S. PATENT DOCUMENTS

| | | |
|---|---|---|
| 5,335,557 A | 8/1994 | Yasutake |
| 5,483,261 A | 1/1996 | Yasutake |
| 5,488,204 A | 1/1996 | Mead et al. |
| 5,590,219 A | 12/1996 | Gourdol |
| 5,612,719 A | 3/1997 | Beernink et al. |
| 5,805,137 A | 9/1998 | Yasutake |
| 5,808,567 A | 9/1998 | McCloud |
| 5,825,352 A | 10/1998 | Bisset et al. |
| 5,835,079 A | 11/1998 | Shieh |
| 5,880,411 A | 3/1999 | Gillespie et al. |
| 5,942,733 A | 8/1999 | Allen et al. |
| 6,188,391 B1 | 2/2001 | Seely et al. |
| 6,268,857 B1 | 7/2001 | Fishkin et al. |
| 6,278,443 B1 | 8/2001 | Amro et al. |
| 6,310,610 B1 | 10/2001 | Beaton et al. |
| 6,323,846 B1 | 11/2001 | Westerman et al. |
| 6,392,636 B1 | 5/2002 | Ferrari et al. |

(Continued)

FOREIGN PATENT DOCUMENTS

EP  0 665 508 A2  8/1995

(Continued)

OTHER PUBLICATIONS

International Search Report mailed Mar. 30, 2009, for PCT Application No. PCT/US2007/089173 filed Dec. 28, 2007, nine pages.

(Continued)

*Primary Examiner* — Alexander Eisen
*Assistant Examiner* — Matthew Yeung
(74) *Attorney, Agent, or Firm* — Morrison & Foerster LLP

(57) ABSTRACT

One or more multi-touch skins can placed along three dimensions of an object. The one or more multi-touch skins enable multi-touch inputs during the operation of the object. The multi-touch inputs can be tracked to monitor the operation of the object and provide feedback to the operator of the object. The one or more multi-touch skins can further enable gestures for configuring and operating the object. The one or more multi-touch skins can also be used to implement any number of GUI interface objects and actions. A multi-touch skin that measures the force of a touch in one or more directions is also provided.

20 Claims, 10 Drawing Sheets

U.S. PATENT DOCUMENTS

| | | |
|---|---|---|
| 6,597,347 B1 | 7/2003 | Yasutake |
| 6,597,384 B1 | 7/2003 | Harrison |
| 6,690,387 B2 | 2/2004 | Zimmerman et al. |
| 7,015,894 B2 | 3/2006 | Morohoshi |
| 7,084,856 B2 | 8/2006 | Huppi |
| 7,184,064 B2 | 2/2007 | Zimmerman et al. |
| 7,312,785 B2 | 12/2007 | Tsuk et al. |
| 7,345,671 B2 | 3/2008 | Robbin et al. |
| 7,663,607 B2 | 2/2010 | Hotelling et al. |
| 7,694,231 B2 | 4/2010 | Kocienda et al. |
| 2002/0015024 A1 | 2/2002 | Westerman et al. |
| 2002/0176016 A1 | 11/2002 | Misawa et al. |
| 2002/0190727 A1 | 12/2002 | Morimoto |
| 2004/0164954 A1* | 8/2004 | Rekimoto ............... 345/156 |
| 2005/0264538 A1 | 12/2005 | Yeh |
| 2006/0026521 A1 | 2/2006 | Hotelling et al. |
| 2006/0026535 A1 | 2/2006 | Hotelling et al. |
| 2006/0044260 A1 | 3/2006 | Harley et al. |
| 2006/0044280 A1 | 3/2006 | Huddleston et al. |
| 2006/0066588 A1 | 3/2006 | Lyon et al. |
| 2006/0097991 A1 | 5/2006 | Hotelling et al. |
| 2006/0103633 A1 | 5/2006 | Gioeli |
| 2006/0111093 A1 | 5/2006 | Shim et al. |
| 2006/0176270 A1 | 8/2006 | Sachs |
| 2006/0197750 A1 | 9/2006 | Kerr et al. |
| 2006/0197753 A1 | 9/2006 | Hotelling |
| 2006/0238517 A1 | 10/2006 | King et al. |
| 2006/0238522 A1 | 10/2006 | Westerman et al. |
| 2007/0182722 A1 | 8/2007 | Hotelling et al. |
| 2007/0198926 A1 | 8/2007 | Joguet et al. |
| 2008/0158172 A1 | 7/2008 | Hotelling et al. |
| 2008/0165255 A1 | 7/2008 | Christie et al. |

FOREIGN PATENT DOCUMENTS

| | | |
|---|---|---|
| EP | 0 665 508 A3 | 8/1995 |
| EP | 0 665 508 B1 | 8/1995 |
| EP | 1 418 491 A2 | 5/2004 |
| EP | 1 418 491 A3 | 5/2004 |
| EP | 1 445 682 A2 | 8/2004 |
| EP | 1 445 682 A3 | 8/2004 |
| JP | 2000-163031 A | 6/2000 |
| JP | 2002-342033 A | 11/2002 |
| WO | WO-97/18547 A1 | 5/1997 |
| WO | WO-2004/053782 A1 | 6/2004 |
| WO | WO-2004/114105 A2 | 12/2004 |
| WO | WO-2004/114105 A3 | 12/2004 |
| WO | WO-2005/114624 A2 | 12/2005 |
| WO | WO-2005/114624 A3 | 12/2005 |
| WO | WO-2006/013485 A2 | 2/2006 |
| WO | WO-2006/075267 A2 | 7/2006 |
| WO | WO-2006/075267 A3 | 7/2006 |
| WO | WO-2006/096501 A1 | 9/2006 |
| WO | WO-2008/085789 A2 | 7/2008 |
| WO | WO-2008/085789 A3 | 7/2008 |
| WO | WO-2008/085790 A2 | 7/2008 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Sep. 1, 2010, for U.S. Appl. No. 11/818,466, 21 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," *CHI '92*, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Anonymous. (2008). NoviiRemote Deluxe Review from the Gadgeteer.com located at <http://www.novii.tv/news/article//allarticle/article5/...>, last visited May 8, 2008, six pages.

Anonymous. (Feb. 21, 2008). "Apple iPhone Trackpad Turns into PC Remote Control," Video Review located at <http://www.phonesreview.co.uk/2008/02/21/video-apple-iphone-trackpad-turns-into-pc-remote-control-download-it-now...>, last visited Apr. 18, 2008, three pages.

Hromadka, J. (Jul. 6, 2005). "NoviiRemote Blaster," *Treocentral.com*, located at <http://www.treocentral.com/content/Stories/630-1.html>, last visited May 8, 2008, three pages.

Iftode, L. et al. (2008). "Smart Phone: An Embedded System for Universal Interactions," *Rutger's University, Department of Computer Science*, seven pages.

International Search Report mailed Nov. 26, 2008, for PCT Application No. PCT/US2007/089172, filed Dec. 28, 2007, six pages.

Izadi, S. et al. (2007). "C-Slate: A Multi-Touch and Object Recognition System for Remote Collaboration using Horizontal Surfaces," *Microsoft Research—Cambridge*, eight pages.

Sellers, D. (Mar. 2, 2006). "Apple Files New Patent for Wide Touchpad for Notebooks," *Macsimum News*, located at <http://www.macsimumnews.com/index.php/archive/apple_files_new_patent_for_wide_touchpad_for_notebooks/>, last visited Apr. 11, 2008, 11 pages.

Webb, W. (Jan. 10, 2005), "Smart Phones: The Next Embedded Interface," *Forbes.com*, located at <http/:www.forbes.com/technology/wireless/feeds/wireless/2005/01...005_01_10_eng-cahners_eng-cahners_084514_7136474990124214945.html>, last visited May 8, 2008, six pages.

P. Dietz, et al., "DiamondTouch: A Multi-User Touch Technology," UIST 2001, pp. 219-226.

M. Fukumoto, et al., "Body Coupled FingeRing: Wireless Wearable Keyboard," Computer Human Interaction, 1997.

J. Rekimoto, "SmartSkin: An Infrastructure for Freehand Manipulation on Interactive Surfaces," Computer Human Interaction, 2002.

J. Rekimoto, et al., ToolStone: Effective Use of the Physical Manipulation Vocabularies of Input Devices, UIST 2000, pp. 109-117.

D. Rubine, et al., "Programmable Finger-tracking Instrument Controllers," Computer Music Journal, vol. 14, No. 1, Spring 1990.

Final Office Action mailed Feb. 16, 2011, for U.S. Appl. No. 11/818,466, filed Jun. 13, 2007, 22 pages.

\* cited by examiner

US 8,144,129 B2

FLEXIBLE TOUCH SENSING CIRCUITS

CROSS-REFERENCE TO RELATED APPLICATIONS

The present invention is a continuation-in-part of commonly assigned U.S. Application entitled "Gestures For Devices Having One Or More Touch Sensitive Surfaces," filed Jun. 13, 2007, which in turn claims the benefit under 35 USC 119(e) of U.S. Provisional Application No. 60/878,828, filed Jan. 5, 2007. The contents of the identified U.S Application entitled "Gestures For Devices Having One Or More Touch Sensitive Surfaces" and U.S. Provisional Application 60/878,828 are incorporated by reference herein.

FIELD OF INVENTION

This relates to a multi-touch skin placed along three-dimensions of an object for enabling multi-touch inputs during the operation of the object. This also relates to a multi-touch skin that measures the force of a touch in one or more directions.

BACKGROUND OF THE INVENTION

Touch pads and touch screens are input devices for operating a device. With a touch pad, such as touch pads on a personal laptop computer, the movement of the input pointer on a display generally corresponds to the relative movements of the user's finger as the finger is moved along a surface of the touch pad. Touch screens are a type of display screen that can include a touch-sensitive transparent panel that overlays the display screen. When using a touch screen, a user typically makes a selection on the display screen by pointing directly to objects (such as GUI objects) displayed on the screen.

In both of these cases, the user moves one or more fingers on a two-dimensional surface to operate the device. However, for the operation of many devices, it is desirable, preferable or even necessary for the user to move his or her fingers over a three-dimensional surface. Thus, there is a need for enabling multi-touch inputs and gestures in the operation of such devices.

SUMMARY OF THE INVENTION

This is directed to a multi-touch skin placed along three dimensions of an object. A single multi-touch skin can be configured to span all three dimensions or two or more multi-touch skins can be used to span the three dimensions. The one or more multi-touch skins can be permanently attached to the object or temporarily placed on the object.

Once placed on the object, the one or more multi-touch skins enable multi-touch inputs during the operation of the object. The multi-touch inputs can be tracked to monitor the operation of the object and provide feedback to the operator of the object.

The one or more multi-touch skins can further enable gestures for configuring and operating the object. The one or more multi-touch skins can also be used to implement any number of GUI interface objects and actions.

This also relates to an improved multi-touch skin for measuring the magnitude (Z) of a touch. In one example, the multi-touch skin has a corrugated surface.

This also relates to a multi-touch skin that can measure not only the magnitude (Z) of a touch, but also the force of the touch in one or more directions, i.e., the x, y and/or z directions. The four types of data can enable a broad vocabulary of actions and gestures.

BRIEF DESCRIPTION OF THE DRAWINGS

This will be readily understood by the following description in conjunction with the accompanying drawings, wherein like reference numerals designate like structural elements.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the invention.

Figure 1A:
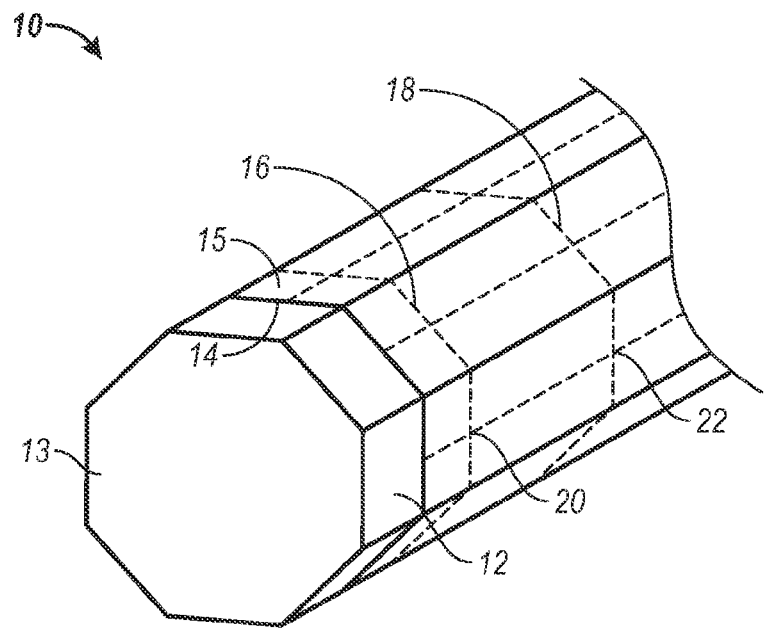
FIGS. 1A and 1B illustrate an exemplary embodiment in which one multi-touch skin spans three dimensions of an object.
Figure 1B:
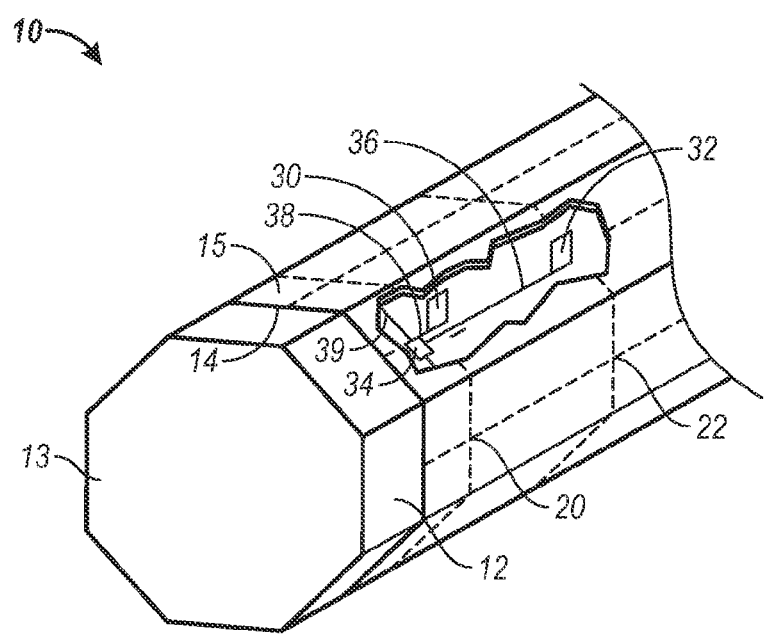

FIGS. 1A and 1B illustrate an exemplary embodiment of a single multi-touch skin spanning three dimensions of an object. In accordance with one embodiment, object 10 illustrated in FIGS. 1A and 1B can be a piece of sporting equipment, such as a tennis racket, golf club or hockey stick. Object 10 can include a handle 12 that is designed to be grasped by a player while playing the sport associated with object 10. FIG. 1A illustrates multi-touch skin 14 wrapping around the entire circumference of handle 12 and extending along the length of handle 12. In this manner, multi-touch skin 14 spans three dimensions of object 10 and enables multi-touch input as a player grasps handle 12 in the operation of object 10.

The dimensions of multi-touch skin 14 will vary depending on the size of object 10 and how the player grasps the object. For example, the dimensions of multi-touch skin 14 for a dart will be much smaller than a multi-touch skin for a tennis racket, golf club or hockey stick, given the dart's size and how it is held by only two fingers. The shape of multi-touch skin 14 will also vary depending on how the player grasps object 10. For example, the multi-touch skin 14 can be positioned in one or more patches spanning three dimensions of an object if the object, such as a gun, is held with spread fingers.

Multi-touch skin 14 can be configured to recognize multiple touch events that occur at different locations on surface 15 at the same time and monitor the operation of the object 10. This can be achieved through a multi-touch sensing arrangement. In the exemplary arrangement illustrated in FIG. 1A, surface 15 of multi-touch skin 14 is divided into several independent and spatially distinct sensing nodes, such as nodes 16, 18, 20 and 22. The nodes are typically hidden from view and are dispersed about surface 15. Each node represents a different position on surface 15 and is capable of generating a signal at the same time as other nodes. In the simplest case, a signal is produced each time an object is placed over a node. When, for example, handle 12 is grasped by several fingers and a palm, multiple signals are generated corresponding to the nodes touched by the surface contact.

The number of nodes can be widely varied. The number of nodes generally depends on the desired sensitivity as well as the transparency, if desired, of multi-touch skin 14. More nodes generally increases sensitivity, but reduces transparency (and vice versa). FIG. 1A illustrates the nodes in a grid-like Cartesian system. However, as with the number of nodes, the configuration of nodes can be widely varied.

In the embodiment of FIG. 1A, the nodes detect touches through capacitive sensing. Capacitive sensing nodes can be widely varied. For example, capacitive sensing nodes can be based on "self" capacitance or "mutual" capacitance.

In self capacitance, each node in the multi-touch skin can be provided by an individual charged electrode. As an object, such as a finger, approaches the surface of a multi-touch skin, the object couples capacitively to the electrodes in close proximity to the object, thereby stealing charge away from the electrodes. The amount of charge in each of the electrodes is measured by a sensing circuit to determine the position of the object.

In mutual capacitance, a multi-touch skin can include a two layer grid of spatially separated lines or wires. In the simplest case, the upper layer can include lines in rows while the lower layer can include lines in columns (e.g., orthogonal). The nodes are provided at the intersections of the rows and columns. During operation, the rows are charged and the charge couples capacitively to the columns at the intersection. As an object, such as a finger, approaches the surface of the multi-touch skin, the object couples capacitively to the rows at the intersections in close proximity to the object, thereby stealing charge away from the rows and therefore the columns as well. The amount of charge in each of the columns is measured by the sensing circuit to determine the positions of multiple objects when they touch the multi-touch skin.

In either self-capacitance or mutual capacitance, each node works independently of the other nodes so as to produce simultaneously occurring signals representative of different points on multi-touch skin 14.

In the embodiment of FIG. 1A, multi-touch skin 14 employs self-capacitance and includes a plurality of capacitive sensing electrodes as further illustrated in FIG. 1B. Each electrode corresponds to a node and, thus, represents a different coordinate on the surface of multi-touch skin 14. For example, electrode 30 in FIG. 1B corresponds to node 16 in FIG. 1A, electrode 32 corresponds to node 18 and so on. The electrodes can be configured to receive capacitive input from one or more objects, such as fingers, touching the surface 15 of multi-touch skin 14. When a finger is proximate to an electrode, the finger steals charge as described above.

The electrodes can be connected to a capacitive sensing circuit including sensor ICs through traces that are positioned in the gaps found between the spaced apart electrodes. The electrodes are spaced apart in order to electrically isolate them from each other as well as to provide a space for separately routing the traces. For example, in the internal portion of multi-touch skin 14, illustrated in FIG. 1B, electrodes 30 and 32 are connected to sensor IC 34 via traces 36 and 38. Any number of sensor ICs may be used. For example, a single chip may be used for all electrodes, or multiple chips may be used for a single or group of electrodes. In FIG. 1B, sensor IC 34 is connected to a group of electrodes, including electrodes 30 and 32, along a row. While only two traces are shown in FIG. 1B, it will be appreciated the number of traces connected to a given sensor IC can be more than shown if there are more electrodes in the row.

Each sensor IC can measure the capacitance at each electrode to which it is connected and report its findings or some form thereof to a host controller. The sensor ICs may for example convert the analog capacitive signals to digital data and thereafter transmit the digital data over a serial bus, such as bus 39, to a host controller or processor. In most cases, the sensor ICs report tracking signals, which can be a function of both the position of the electrode and the intensity of the capacitance at the electrode. If the host controller or processor is positioned on object 10, then bus 39 can be directly connected to the host controller or processor for transmission of data. If the host controller or processor is positioned apart from object 10, then the transmission of data to the host controller or processor may be through a wired or wireless connection.

The electrodes, such as electrodes 30 and 32, and traces, such as traces 36 and 38, can be made from any suitable conductive material. Depending on the application, the material can be transparent as well. By way of example, the electrodes and traces may be formed from indium tin oxide (ITO). In addition, the sensor ICs, such as sensor IC 34, of the sensing circuit can be electrically coupled to the traces using any suitable technique.

In one embodiment, the electrodes, traces and sensing circuit are attached to a flex circuit. The flex circuit can be a single-side circuit made of single copper conductor layer on a flexible dielectric film. Such single-sided flex circuits can be made as thin as 0.10 mm or even smaller. The flex circuit can be fabricated with or without a cover layer. The flex circuit can then be wrapped around and attached to handle 12 as illustrated in FIGS. 1A and 1B.

Alternatively, one or more sensor ICs of the sensing circuit can be placed directly on handle 12 such as on its bottom 13. In another implementation, the electrodes, traces and sensing circuit can be embedded on handle 12 using any suitable patterning technique.

The distribution of the electrodes, such as electrodes 30 and 32, can be widely varied. For example, the electrodes can be positioned almost anywhere in multi-touch skin 14. The electrodes can be positioned randomly or in a particular pattern about multi-touch skin 14. For the latter, the position of the electrodes 102 can depend on the coordinate system used. For example, the electrodes can be placed in an array of rows and columns for Cartesian coordinates as illustrated in FIGS. 1A and 1B or an array of concentric and radial segments for polar coordinates. Within each array, the rows, columns, concentric or radial segments can be stacked uniformly relative to the others or they can be staggered or offset relative to the others. Additionally, within each row or column, or within each concentric or radial segment, the electrodes can be staggered or offset relative to an adjacent electrode.

Furthermore, the electrodes, such as electrodes 30 and 32, can be formed from almost any shape whether simple (e.g., squares, circles, ovals, triangles, rectangles, polygons, and the like) or complex (e.g., random shapes). Further still, the shape of the electrodes can have identical shapes or they may have different shapes. For example, one set of electrodes can have a first shape while a second set of electrodes can have a second shape that is different than the first shape. The shapes are generally chosen to maximize the sensing area and, if the multi-touch skin is transparent, to minimize optical differences between the gaps and the transparent electrodes.

In addition, the size of the electrodes, such as electrodes 30 and 32, can vary according to the specific needs of each object. In some cases, the size of the electrodes can correspond to about the size of a finger tip. For example, the size of the electrodes can be on the order of 4-5 $mm^2$. In other cases, the size of the electrodes can be smaller than the size of the finger tip so as to improve resolution of the multi-touch skin (the finger can influence two or more electrodes at any one time thereby enabling interpolation). Like the shapes, the size of the electrodes can be identical or they can be different. For example, one set of electrodes can be larger than another set of electrodes. Moreover, any number of electrodes can be used. The number of electrodes can be determined by the size of the multi-touch skin as well as the size of each electrode. In most cases, it would be desirable to increase the number of electrodes so as to provide higher resolution, i.e., more information can be used for such things as acceleration.

Although the sense traces, such as traces 36 and 38, can be routed a variety of ways, they can be routed in manner that reduces the distance they have to travel between their electrode and the sensor circuit, and that reduces the size of the gaps found between adjacent electrodes. The width of the sense traces can also be widely varied. The widths can be generally determined by the amount of charge being distributed there through, the number of adjacent traces, and the size of the gap through which they travel. It is generally desirable to maximize the widths of adjacent traces in order to maximize the coverage inside the gaps thereby creating a more uniform optical appearance if the skin is transparent.

In the illustrated embodiment, the electrodes, such as electrodes 30 and 32, are positioned in a pixilated array. The electrodes are positioned in rows that extend to and from the sides of the multi-touch skin. Within each row, the identical electrodes are spaced apart and positioned laterally relative to one another (e.g., juxtaposed).

The sense traces for each row can be routed in two different directions. The sense traces on one side of the row can be routed to a sensor IC, such as sensor IC 34, located on the left side and the sense traces on the other side of the row can be routed to another sensor IC located on the right side of the multi-touch skin 14 (not shown). This is done to minimize the gap formed between rows. The gap can for example be held to about 20 microns. As should be appreciated, the spaces between the traces can stack thereby creating a large gap between electrodes. If routed to one side, the size of the space would be substantially doubled thereby reducing the resolution of the multi-touch skin. Moreover, the shape of the electrodes, such as electrodes 30 and 32, can be in the form of a parallelogram, and more particularly a parallelogram with sloping sides.

Multi-touch skin 14 illustrated in FIG. 1B utilizes the concept of self-capacitance as described above. It can be appreciated that other multi-touch sensor detection methods including without limitation mutual capacitance can be utilized. Multi-touch sensor detection methods are described in commonly assigned co-pending applications, including U.S. application Ser. No. 10/840,862, published on May 11, 2006 as U.S. Patent Publication No. US2006/0097991, U.S. application Ser. No. 11/428,522, published on Oct. 26, 2006 as U.S. Patent Publication No. US2006/0238522, and U.S. application Ser. No. 11/649,998 entitled "Proximity and Multi-Touch Sensor Detection and Demodulation," filed on Jan. 3, 2007, the entirety of each of which are hereby incorporated herein by reference.

Figure 2:
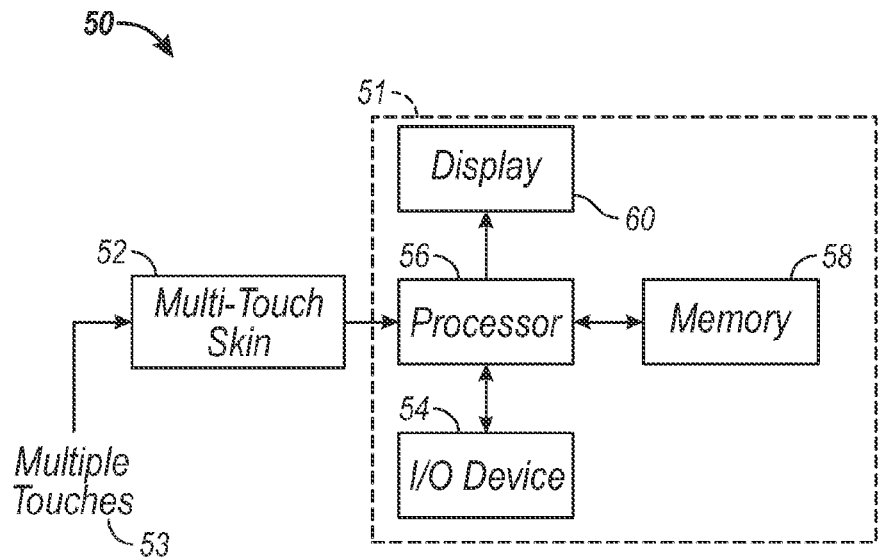
FIG. 2 illustrates a system of a multi-touch skin and a processing device according to an exemplary embodiment.

Once multi-touch skin 14 recognizes a multi-touch event on surface 15, it can produce tracking signals corresponding to the multiple touches. Multi-touch skin 14 can process the tracking signals itself or output the tracking signals to a device for processing. FIG. 2 is a block diagram of system 50 in accordance with one embodiment. In this embodiment, multi-touch skin 52, positioned on an object such as a piece of sporting equipment, outputs tracking signals to device 51. Specifically, multi-touch skin 52 is configured to receive input from a player's touch as he or she grasps the object's handle.

In most cases, multi-touch skin 52 can recognize touches 53 and the position and magnitude of touches on its surface. Multi-touch skin 52 reports touches 53 to device 51. Device 51 can be positioned on the object or separated from the object. If device 51 is positioned on the object, multi-touch skin 52 can report touches 53 to processor 56 to which it is operatively coupled. If device 51 is separated from the object, multi-touch skin 52 can report touches 53 to processor 56 through, for example, a cable connection or a wireless connection.

Processor 56 is configured to execute instructions and to carry out operations associated with device 51. For example, using instructions retrieved from memory 58, processor 56 can control the reception and manipulation of input and output data between components of device 51. Processor 56 can be a single-chip processor or can be implemented with multiple components.

In most cases, processor 56 together with an operating system operate to execute computer code and produce and use data. The computer code and data may reside within a program storage block 58 that is operatively coupled to processor 56. Program storage block 56 generally provides a place to hold data that is being used by system 50. By way of example, program storage block 58 can include Read-Only Memory (ROM), Random-Access Memory (RAM), hard disk drive and/or the like. The computer code and data could also reside on a removable storage medium and loaded or installed onto the computer system when needed.

Device 51 can also include an input/output (I/O) device 54 that is operatively coupled to processor 56. I/O device 54 may be integrated with processor 56 or it may be a separate component as shown. I/O device 54 is generally configured o control interactions with one or more I/O devices. The I/O device 54 generally operates by exchanging data between processor 56 and external I/O devices that desire to communicate with the processor. The external I/O devices and I/O device 54 typically communicate through a data link. The data link may be a one way link or two way link. In some cases, the external I/O devices may be connected to I/O device 54 through wired connections. In other cases, the external I/O devices may be connected through wireless connections. By way of example, the data link may correspond to PS/2, USB, Firewire, IR, RF, Bluetooth or the like.

Device 51 can also include a display 60 that is operatively coupled to processor 56. Display 60 may be a separate component (peripheral device) or it may be integrated with the processor and program storage to form a computer (all in one machine) on the object. Display 60 can be configured to display a graphical user interface (GUI) including perhaps a pointer or cursor as well as other information to the user or player. For example, display 60 may be a monochrome display, color graphics adapter (CGA) display, enhance graphics adapter (EGA) display, variable-graphics-array (VGA) display, super VGA display, liquid crystal display (e.g., active matrix, passive matrix and the like), cathode ray tube (CRT), plasma displays and the like.

Figure 3:
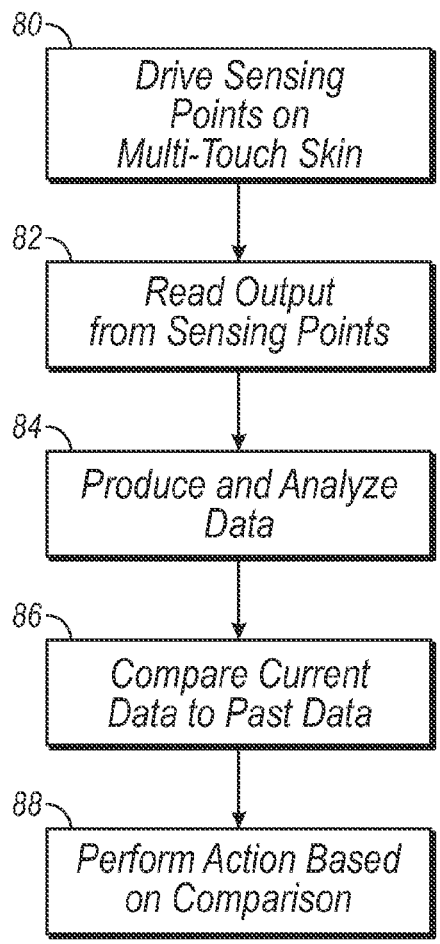
FIG. 3 is a flow diagram of multi-touch processing method in accordance with an exemplary embodiment.

FIG. 3 is a flow diagram in accordance with one embodiment of the present invention that sets forth how a multi-touch event is interpreted. The method generally begins at block 80 where a plurality of sensing points on a multi-touch skin can be driven. For example, a voltage can be applied to the electrodes in a multi-touch skin, such as skin 14 of FIGS. 1A and 1B. Following block 80, the process flow proceeds to block 82 where outputs (voltage) from all the sensing points can be read. This block may include multiplexing and digitizing outputs. Following block 82, the process flow proceeds to block 84 where an image or other form of data (signal or signals) of the multi-touch skin at one moment in time can be produced and thereafter analyzed to determine where the objects, such as fingers, are touching the multi-touch skin. For example, as discussed below with respect to FIG. 4, the boundaries for each unique touch can be calculated, and thereafter the coordinates thereof can be found.

Once the coordinates of the touch are found, they can be analyzed as indicated in block 84. For example, the coordinates can be analyzed to monitor how the object is being operated and provide feedback. In the case of a tennis racket or a golf club, for example, the coordinates of the player's grasp of the handle can be detected. The coordinates can then be analyzed to determine if the player has correctly grasped the handle for a forehand stroke or a drive. The analysis may include obtaining other information, such as the orientation of the racket face or club head in relation to the grasp, to determine whether the player has correctly positioned his hand or hands on the handle.

Based on the analysis, an action can be performed. For example, a display, such as display 60 in FIG. 2, can be used to notify the player that he or she has correctly grasped the tennis racket or golf club for the stroke to be performed. The display, for example, can display a green light for a proper grasp and a red light for an incorrect grasp. If the grasp is incorrectly positioned on the handle, the display can further direct the player to correct the grasp. For example, the display can direct the player to move his or her index finger or thumb in a given direction.

Following block 84, the process flow process to block 86 where the current image or signal can be compared to a past image or signal in order to determine a change in pressure, location, direction, speed and acceleration for each object on the multi-touch skin. This information can be subsequently used to perform an action as indicated in block 88. For example, if the grasp was incorrectly positioned on the handle, the current image can be compared to the past image to determine whether the player correctly followed the display's instruction to move an index finger or thumb in a given direction. As another example, the current image can be compared to the past image to determine whether the player is correctly positioning his or her grasp during a stroke or drive. The display can notify the player if his or her grasp is positioned correctly during the stroke or drive and provide direction.

Figure 4:
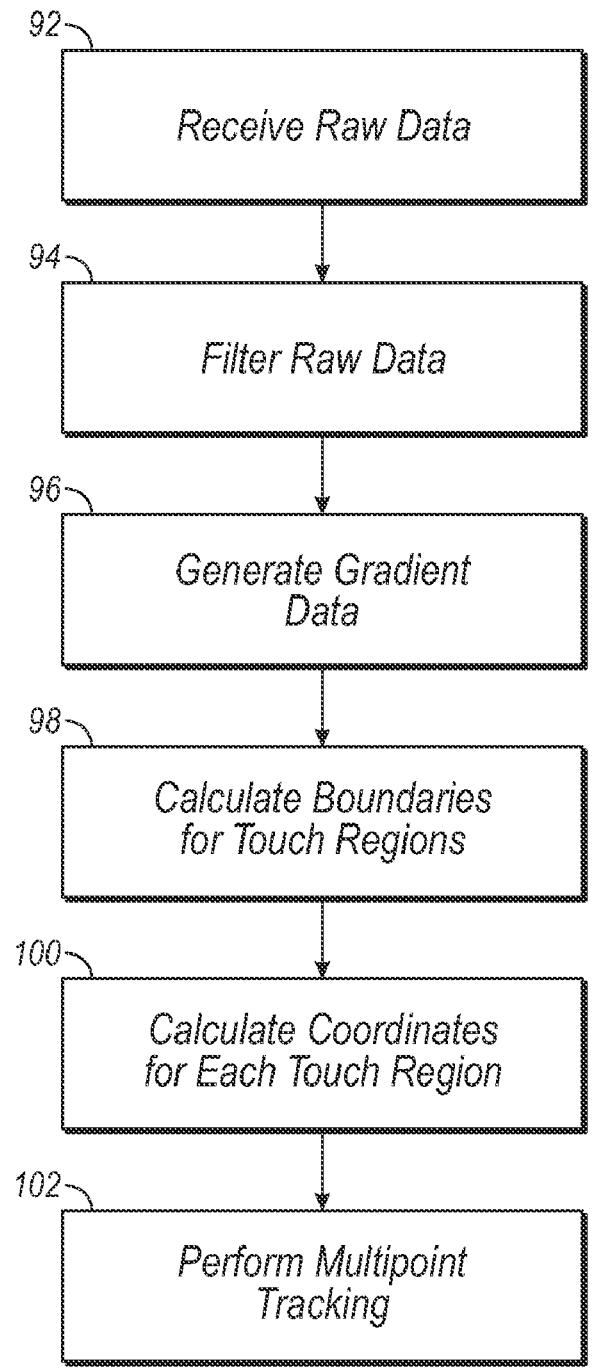
FIG. 4 is a flow diagram of a digital signal processing method in accordance with one embodiment.

FIG. 4 is a flow diagram of a digital signal processing method, in accordance with one embodiment of the present invention. By way of example, the method can generally correspond to block 84 shown and described in FIG. 3. The method generally begins at block 92 where the raw data is received. The raw data can be in a digitized form, and can include values for each node of the multi-touch skin. The values can be between 0 and 256 where 0 equates to the highest capacitive coupling (no touch pressure) and 256 equates to the least capacitive coupling (full touch pressure).

Following block 92, the process flow proceeds to block 94 where the raw data is filtered. As should be appreciated, the raw data can include some noise. The filtering process can be configured to reduce the noise. By way of example, a noise algorithm can be run that removes points that are not connected to other points. Single or unconnected points generally indicate noise while multiple connected points generally indicate one or more touch regions, which are regions of the multi-touch skin that are touched by objects such as fingers.

Following block 94, the process flow proceeds to block 96 where gradient data is generated. The gradient data can indicate the topology of each group of connected points. The topology can be based on the capacitive values for each point. Points with the lowest values are steep while points with the highest values are shallow. As should be appreciated, steep points can indicate touch points that occurred with greater pressure while shallow points can indicate touch points that occurred with lower pressure.

Following block 96, the process flow proceeds to block 98 where the boundaries for touch regions are calculated based on the gradient data. In general, a determination can be made as to which points are grouped together to form each touch region.

In one embodiment, the boundaries can be determined using a watershed algorithm. Generally speaking, the algorithm performs image segmentation, which is the partitioning of an image into distinct regions as for example the touch regions of multiple objects in contact with the multi-touch skin. The concept of watershed initially comes from the area of geography and more particularly topography where a drop of water falling on a relief follows a descending path and eventually reaches a minimum, and where the watersheds are the divide lines of the domains of attracting drops of water. Herein, the watershed lines represent the location of pixels, which best separate different objects touching the multi-touch skin. Watershed algorithms can be widely varied. In one particular implementation, the watershed algorithm includes forming paths from low points to a peak (based on the magnitude of each point), classifying the peak as an ID label for a particular touch region, associating each point (pixel) on the path with the peak. These steps are performed over the entire image map thus carving out the touch regions associated with each object in contact with the multi-touch skin.

Following block 98, the process flow proceeds to block 100 where the coordinates for each of the touch regions are calculated. This can be accomplished by performing a centroid calculation with the raw data associated with each touch region. For example, once the touch regions are determined, the raw data associated therewith can be used to calculate the centroid of each touch region. The centroid may indicate the central coordinates (x and y) of a given touch region. These coordinates may be used to perform multi-touch tracking as indicated in block 102. For example, the coordinates for each of the touch regions may be compared with previous coordinates of touch regions to determine positioning changes of the objects touching the multi-touch skin or whether or not touching objects have been added or subtracted or whether a particular object is being tapped. Digital signal processing methods are described in commonly assigned co-pending applications, including U.S. application Ser. No. 10/840,862, published on May 11, 2006 as U.S. Patent Publication No. US2006/0097991, which is hereby incorporated again by reference.

It can be appreciated that a multi-touch skin that spans three dimensions can be employed on any object where, for its operation, touching of the object in three dimensions is desired, preferred or required. Such a multi-touch skin can be applicable, without limitation, to video game input devices, toys, musical instruments, computing devices and peripheral, medical devices, clothes and consumer electronics devices.

Figure 5:
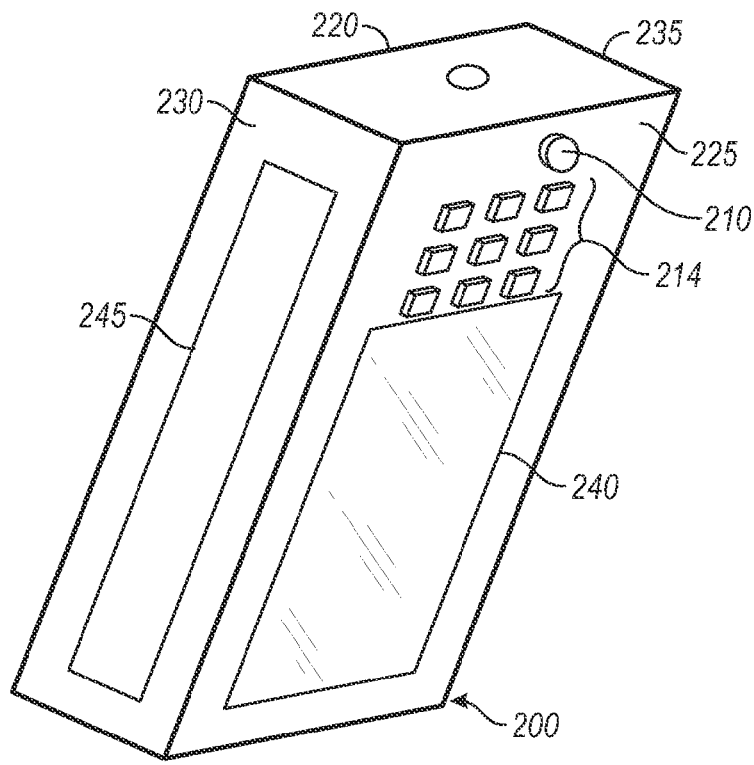
FIG. 5 illustrates an exemplary embodiment of two two-dimensional multi-touch skins spanning three dimensions of an object.
Figure 5:

It can also be appreciated that two or more two-dimensional multi-touch skins spanning three dimensions of an object can be used in place of a single multi-touch skin spanning three dimensions of the object. FIG. 5 illustrates an exemplary embodiment. Remote control 200 of FIG. 5 remotely operates another device. The device can be, for example, a consumer electronics product such as a television. Remote control 200 can have a power button 210 and additional buttons 214, such as a numeric pad, for its operations.

A user can operate remote control 200 by holding it. For example, if the user is right-handed, remote control 200 can be held such that the user's thumb is positioned over the front side 225 of remote control 200, the user's palm supports the back side 220 and his fingers curl around the back side 220 and touch the left side 230 of remote control 200.

In view of the anticipated placement of the user's thumb and fingers, remote control 200 has two two-dimensional multi-touch skins. A first multi-touch skin 240 is placed on the front side 225 of remote control 200 in the x-y plane. A second multi-touch skin 245 is placed on the left-side 230 of remote control 200 in the z-y. (A third multi-touch skin can be placed on the right-side 235 of remote control 200 for left-handed users.) The user's thumb can touch multi-touch skin 240 simultaneously with one or more of his fingers touching multi-touch skin 245. In this manner, multi-touch skins 240 and 245 enable multi-touch input as the user operates remote control 200.

Once each multi-touch skin recognizes a touch event on its respective surface, it can produce one or more tracking signals. The signals can be output to a device, such as illustrated in FIG. 2, for processing.

It should be noted multi-touch skins 240 and 245 are not contiguous. Moreover, as noted above, each multi-touch skin is only two dimensional. The placement of multi-touch skin 240 in the x-y plane and multi-touch skin 245 in the z-y plane nevertheless produces a combined output of multi-touch tracking signals as if a single multi-touch skin spans three dimensions of remote control 200. Thus, FIG. 5 illustrates an embodiment in which two two-dimensional skins are positioned along three dimensions of an object to enable multi-touch inputs in the operation of the object.

The placement of one or more multi-touch skins spanning three dimensions of an object, such as remote control 200, enables gestures for operating the object. For example, the movement of the user's thumb across multi-touch skin 240 can be used to control the selection of a channel. A downward movement of a thumb can numerically decrease the channel number, while an upward movement of the thumb can numerically increase the channel number. Similarly, the movement of one or more fingers along multi-touch skin 24 can be used to reduce or increase volume. Thus, a user can grasp remote control 200 and simultaneously select the channel and volume through multi-touch gestures on skins 240 and 245. Of course, these two gestures can be also be performed separate in time. Whether performed simultaneously or not, these gestures can be tracked as multi-touch inputs in the manner described above with respect to FIGS. 3 and 4.

Gestures can also be used to configure the operation of the object or even a given multi-touch skin. For example, the placement of an additional thumb on multi-touch skin 240 can be used to configure remote control 200 to control a different device, such as a DVD player. The placement of additional finger on multi-touch skin 240 can change the mode for multi-touch skin 245 from volume selection to contrast selection. The movement of one or more fingers along 245 would then reduce or increase the contrast as desired.

It should be appreciated that vocabulary of gestures is not limited to the gestures described above. Additional examples of gestural strokes that can be used as inputs for effecting interface commands, including interactions with UI elements are shown and described in commonly assigned co-pending U.S. application Ser. No. 11/038,590, published as U.S. patent publication no. US2006/0026535, the entirety of which is hereby incorporated by reference, and commonly assigned co-pending application Ser. No. 10/903,964, published as U.S. patent publication no. US2006/0026521, the entirety of which is also hereby incorporated by reference and the parent application filed on Jun. 13, 2007.

It should also be appreciated that it is not necessary to always use a human finger to effect gestural input. Where possible, it can be also sufficient to use a pointing device, such as a stylus, to effect gestural input.

Figure 6:
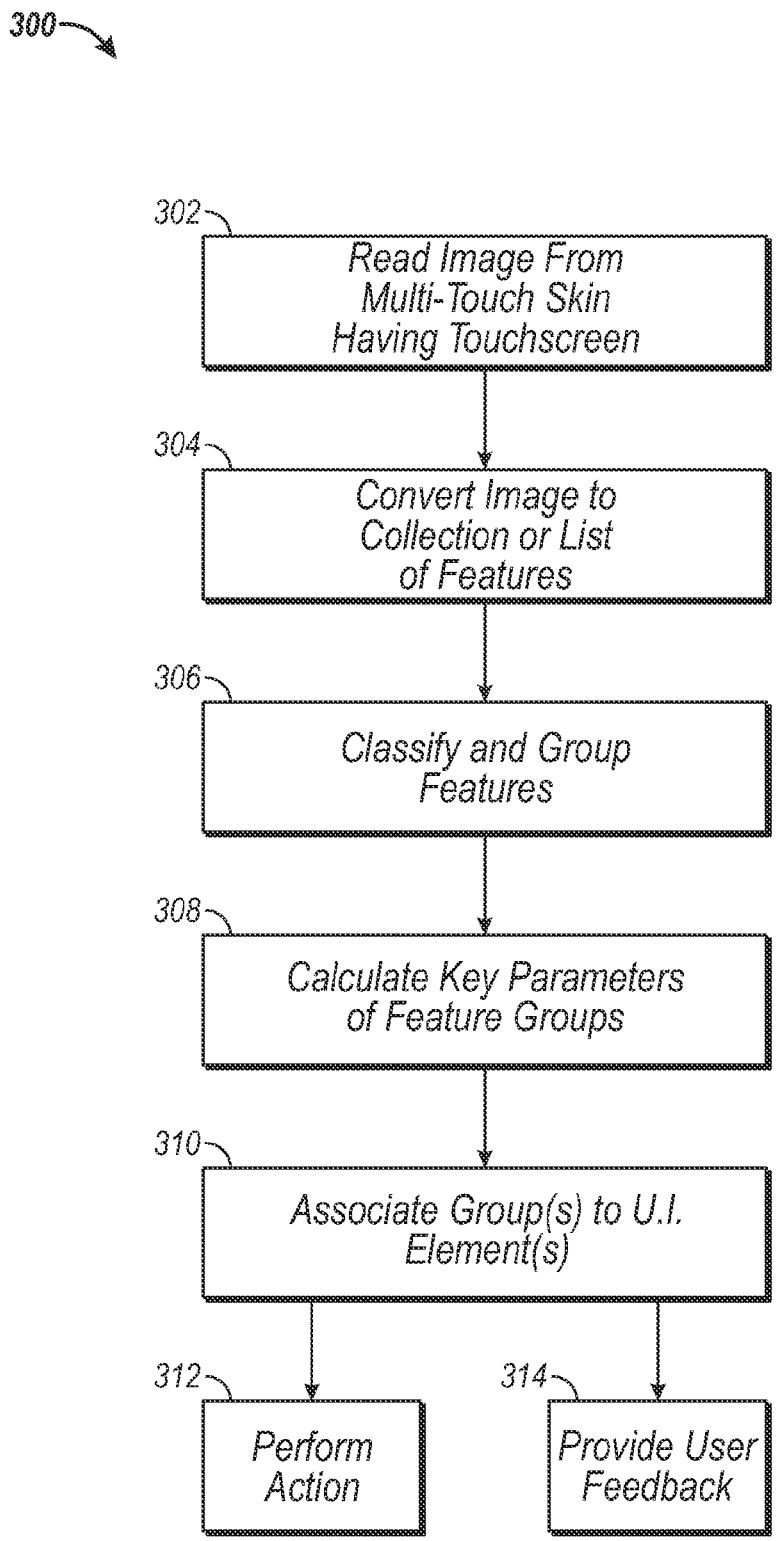
FIG. 6 is a multi-touch processing method in accordance with an exemplary embodiment of this invention.

It should also be appreciated that the one or multi-touch skins spanning three dimensions of an object enable more than gestures. The one or more skins can be used to implement any number of GUI interface objects and actions. FIG. 6 illustrates a multi-touch processing method 300, in accordance with one embodiment of the invention, that allows a multi-touch skin having a touch screen to enable gestures and GUI objects. The multi-touch processing method 300 can for example be performed in the system shown in FIG. 2 or 5, with multi-touch skin 245 being a multi-touch touch screen.

The multi-touch processing method 300 generally begins at block 302 where images can be read from a multi-touch input device, and more particularly a multi-touch touch screen, such as skin 245, illustrated in FIG. 5. Although the term "image" is used it should be noted that the data can come in other forms. In most cases, the image read from multi-touch skin 245 can provide magnitude (Z) as a function of position (x and y) for each sensing point or pixel of the skin. The magnitude can, for example, reflect the capacitance measured at each point.

Figure 7A:
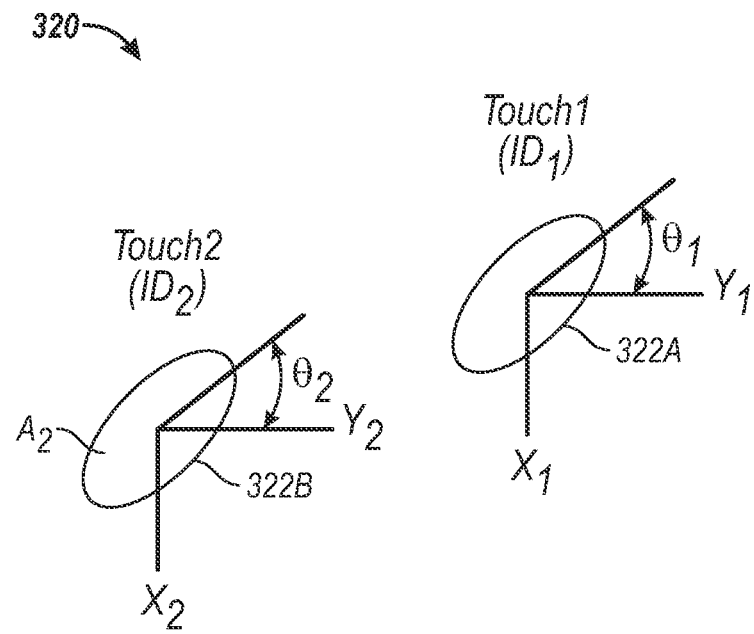
FIGS. 7A and 7B illustrate an image in accordance with an exemplary embodiment of this invention.
Figure 7B:
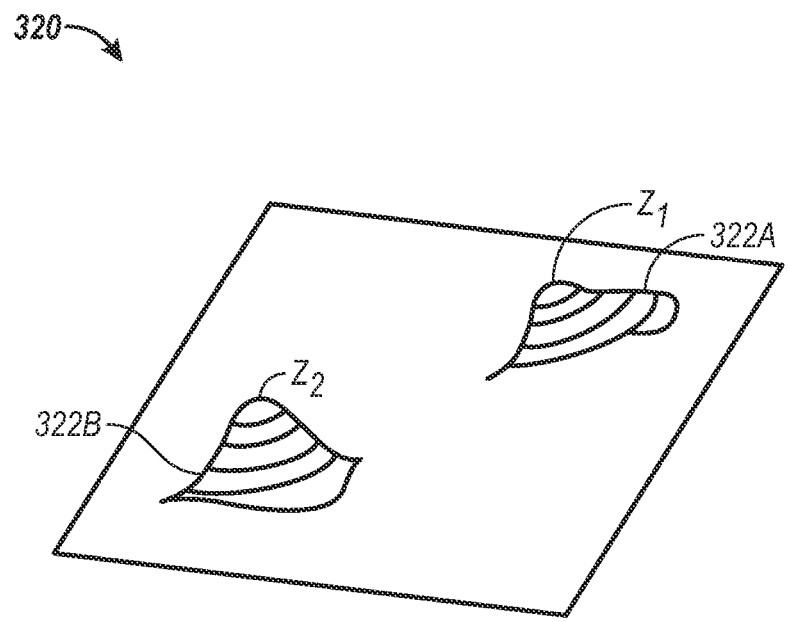

Following block 302, multi-touch processing method 300 proceeds to block 304 where the image can be converted into a collection or list of features. Each feature can represent a distinct input such as a touch. In most cases, each feature can include its own unique identifier (ID), x coordinate, y coordinate, Z magnitude, angle $\Theta$, area A, and the like. By way of example, FIGS. 7A and 7B illustrate a particular image 320 in time. In image 320, there are two features 322A and 322B based on two distinct touches. The touches can for example be formed from a pair of fingers touching multi-touch skin 245. As shown, each feature 322A and 322B can include unique identifier (ID), x coordinate, y coordinate, Z magnitude, angle $\Theta$, and area A. More particularly, the first feature 322A can be represented by $ID_1, X_1, Y_1, Z_1, \Theta_1, A_1$ and the second feature 322B can be represented by $ID_2, X_2, Y_2, Z_2, \Theta_2, A_2$. This data can be outputted for example using a multi-touch protocol.

The conversion from data or images to features can be accomplished using methods described in copending U.S. patent application Ser. No. 10/840,862, published as U.S.

Patent Publication No. US2006/009771 and described above with respect to FIG. 4. As disclosed therein, the raw data can be typically received in a digitized form, and can include values for each node of the touch screen. The values can be between 0 and 256 where 0 equates to no touch pressure and 256 equates to full touch pressure. Thereafter, the raw data can be filtered to reduce noise. Once filtered, gradient data, which indicates the topology of each group of connected points, can be generated. Thereafter, the boundaries for touch regions can be calculated based on the gradient data (i.e., a determination can be made as to which points are grouped together to form each touch region). By way of example, a watershed algorithm can be used as described above. Once the boundaries are determined, the data for each of the touch regions can be calculated (e.g., X, Y, Z, $\Theta$, A).

Following block 304, multi-touch processing method 300 proceeds to block 306 where feature classification and groupings can be performed. During classification, the identity of each of the features can be determined. For example, the features can be classified as a particular finger, thumb, palm or other object. Once classified, the features can be grouped. The manner in which the groups can be formed can be widely varied. In most cases, the features can be grouped based on some criteria (e.g., they carry a similar attribute). For example, the two features shown in FIGS. 7A and 7B can be grouped together because each of these features is located in proximity to each other or because they are from the same hand. The grouping can include some level of filtering to filter out features that are not part of the touch event. In filtering, one or more features can be rejected because they either meet some predefined criteria or because they do not meet some criteria.

Figure 8:
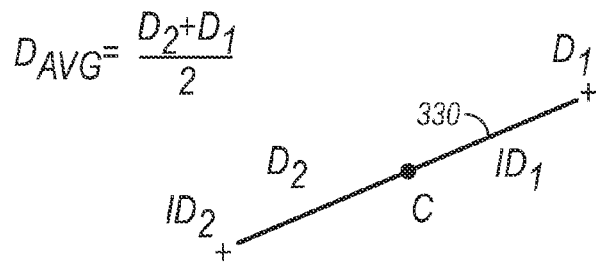
FIG. 8 illustrates a group of features in accordance with an exemplary embodiment of this invention.

Following block 306, the multi-touch processing method 300 proceeds to block 308 where key parameters for the feature groups can be calculated. The key parameters can include distance between features, x/y centroid of all features, feature rotation, total pressure of the group (e.g., pressure at centroid), and the like. As shown in FIG. 8, the calculation can include finding the centroid C, drawing a virtual line 330 to each feature from the centroid C, defining the distance D for each virtual line ($D_1$ and $D_2$), and then averaging the distances $D_1$ and $D_2$. Once the parameters are calculated, the parameter values can be reported. The parameter values can be typically reported with a group identifier (GID) and number of features within each group (in this case three). In most cases, both initial and current parameter values can be reported. The initial parameter values can be based on touch down, i.e., when the user sets their fingers on the touch screen, and the current values can be based on any point within a stroke occurring after touch down.

As should be appreciated, blocks 302-308 can be repetitively performed during a user stroke thereby generating a plurality of sequentially configured signals. The initial and current parameters can be compared in later steps to perform actions in the system.

Following block 308, the process flow proceeds to block 310 where the group is or can be associated with a user interface (UI) element. UI elements can be buttons boxes, lists, sliders, wheels, knobs, pictures, documents, icons, etc. Each UI element can represent a component or control of the user interface. In the case of remote control 200, the UI element can be a channel selection button as an example. The application behind the UI element(s) can have access to the parameter data calculated in block 308. In one implementation, the application can rank the relevance of the touch data to the UI element corresponding there to. The ranking can be based on some predetermined criteria. The ranking can include producing a figure of merit, and whichever UI element has the highest figure of merit, giving it sole access to the group. There can even be some degree of hysteresis as well (once one of the UI elements claims control of that group, the group sticks with the UI element until another UI element has a much higher ranking). By way of example, the ranking can include determining proximity of the centroid (or features) to the image object associated with the UI element.

Following block 310, the multi-touch processing method 300 proceeds to blocks 312 and 314. The blocks 312 and 314 can be performed approximately at the same time. From the user perspective, in one embodiment, the blocks 312 and 314 appear to be performed concurrently. In block 312, one or more actions can be performed based on differences between initial and current parameter values, and can also be based to a UI element to which they can be associated, if any. In block 314, user feedback pertaining to the one or more actions being performed can be provided. By way of example, user feedback can include display, audio, tactile feedback and/or the like.

Figure 9:
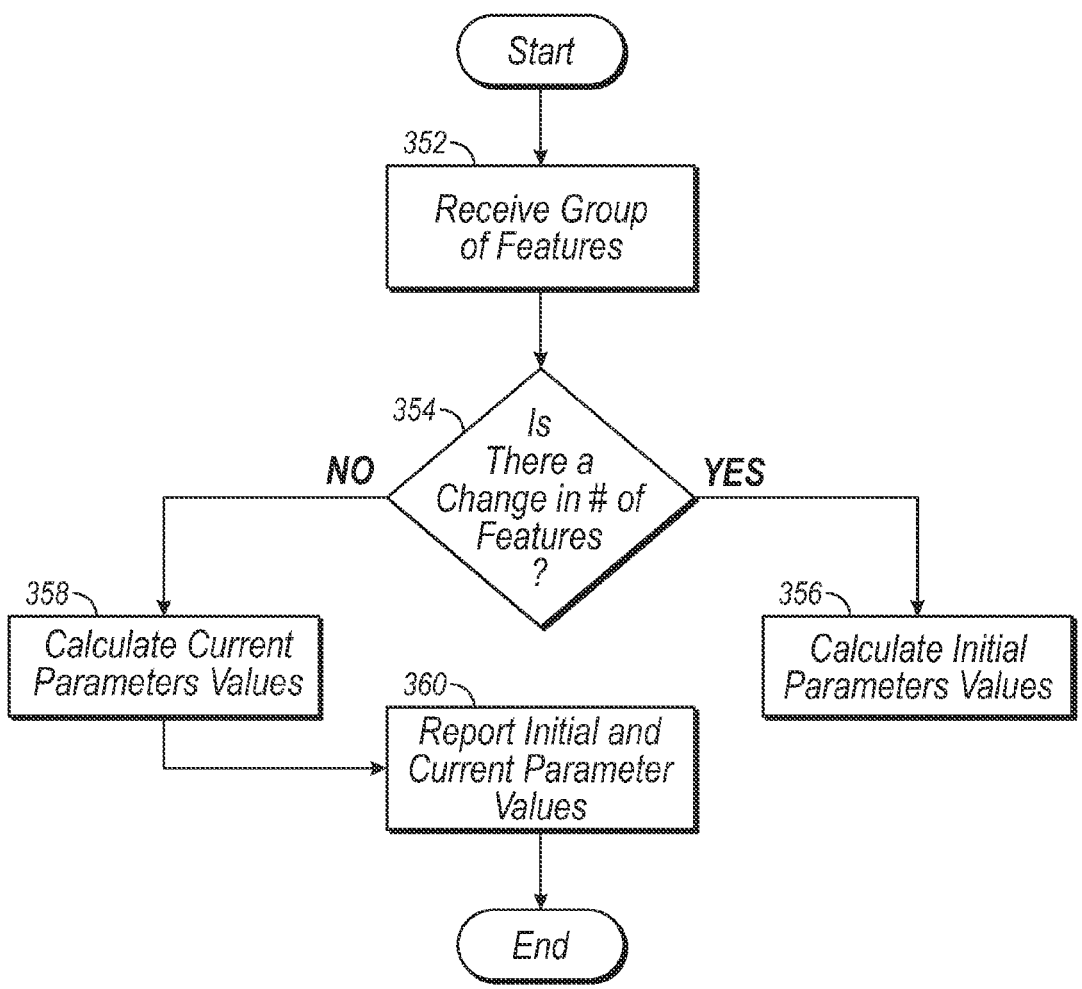
FIG. 9 is a parameter calculation method in accordance with an exemplary embodiment of this invention.

FIG. 9 is a parameter calculation method 350, in accordance with one embodiment of the invention. The parameter calculation method 350 can, for example, correspond to block 308 shown in FIG. 6. The parameter calculation method 350 generally begins at block 352 where a group of features can be received. Following block 352, the parameter calculation method 350 proceeds to block 354 where a determination can be made as to whether or not the number of features in the group of features has changed. For example, the number of features can have changed due to the user picking up or placing an additional finger. Different fingers can be needed to perform different controls (e.g., tracking, gesturing). If the number of features has changed, the parameter calculation method 350 proceeds to block 356 where the initial parameter values can be calculated. If the number stays the same, the parameter calculation method 350 proceeds to block 358 where the current parameter values can be calculated. Thereafter, the parameter calculation method 350 proceeds to block 360 where the initial and current parameter values can be reported. By way of example, the initial parameter values can contain the average initial distance between points (or Distance (AVG) initial) and the current parameter values can contain the average current distance between points (or Distance (AVG) current). These can be compared in subsequent steps in order to control various aspects of a computer system.

The above methods and techniques can be used to implement any number of GUI interface objects and actions. For example, gestures can be created to detect and effect a user command to resize a window, scroll a display, rotate an object, zoom in or out of a displayed view, delete or insert text or other objects, etc. Gestures can also be used to invoke and manipulate virtual control interfaces, such as volume knobs, switches, sliders, keyboards, and other virtual interfaces that can be created to facilitate human interaction with remote control 200 or a consumer electronic item.

Although the above embodiment can be described using a virtual control channel selection button or knob, in another embodiment, the UI element can be a virtual scroll wheel. As an example, the virtual scroll wheel can mimic an actual scroll wheel such as those described in U.S. Patent Publication Nos. US2003/0076303A1, US2003/0076301A1, and US2003/0095096A1, all of which are herein incorporated by reference.

It also be appreciated that multi-touch skins 240 and 245 do not have to be identical in type. The selection of the type of multi-touch skin will depend on the application. For example, multi-touch skin 245 can be an opaque touch pad employing self-capacitance, while multi-touch skin 240 can be a transparent multi-touch touch screen employing mutual capacitance as described above and in commonly assigned co-pending applications, including U.S. application Ser. No. 10/840,862, published on May 11, 2006 as U.S. Patent Publication No. US2006/0097991.

Figure 10:
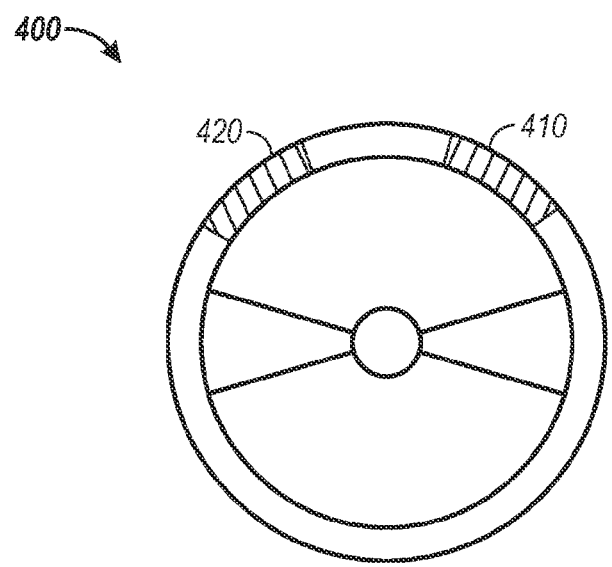
FIG. 10 illustrates an exemplary embodiment of two multi-touch skins spanning three dimensions of an object.

FIG. 10 illustrates yet another exemplary embodiment to show the broad applicability of the present invention. FIG. 10 illustrates a steering wheel 400. Steering wheel 400 can be used for the operation of an actual vehicle or a virtual vehicle. Steering wheel 400 has two multi-touch skins 410 and 420. Multi-touch skin 410 is positioned in the right upper quadrant of steering wheel 400, while multi-touch skin 420 is positioned in the left upper quadrant of steering wheel 400. Each multi-touch skin is wrapped around the entire circumference of steering wheel 400 to span three dimensions of the steering wheel.

When a user operates steering wheel 400, he places his right hand on multi-touch skin 410 and his left hand on multi-touch skin 420. Each skin thus receives a multi-touch input, and each skin outputs corresponding data. The data from each skin can be combined and analyzed by a processor, such as illustrated in FIG. 2 above, to perform multi-touch tracking as described above with respect to FIGS. 3 and 4.

For example, once the coordinates of each multi-touch are determined, they can be analyzed to determine if the user has correctly grasped steering wheel 400. Based on the analysis, an action can be performed, such as notifying the user that he has not correctly grasped steering wheel 400 or that his hands need to grasp steering wheel 400 at "10 o'clock" and "2 o'clock." As described above with respect to FIGS. 3 and 4, a current image and a past image can be compared to determine if the user has properly followed the notification and provide feedback if necessary.

Multi-touch skins 410 and 420 can also be used to operate the vehicle relating to steering wheel 400 via gestural inputs. For example, the tapping of an index finger on multi-touch skin 410 can be used to perform channel selection of a radio in the vehicle. Each tap can correspond to a selection of the next available channel. The tapping of an index finger and pinky finger on multi-touch skin 420 can be used to perform volume selection of the radio. Each tap of an index finger can, for example, correspond to a step increase in volume, while a tap of a pinky finger can correspond to a step decrease in volume. In this way, the user can simultaneously change channels with one hand and control volume with the other hand, without have to focus his attention on the vehicle's radio. Of course, these two gestures can be also be performed separate in time.

Multi-touch skins 410 and 420 can also be used together to configure the operation of the vehicle (e.g., its steering wheel) and another skin. For example, the tapping of two fingers on multi-touch skin 410 can be used to change the mode for multi-touch skin 420 from volume selection for the radio to wiper speed selection. The tapping of an index finger on multi-touch skin 420 would then correspond to a step increase in wiper speed while the tapping of a pinky finer would then correspond to a step decrease in wiper speed.

Figure 11:
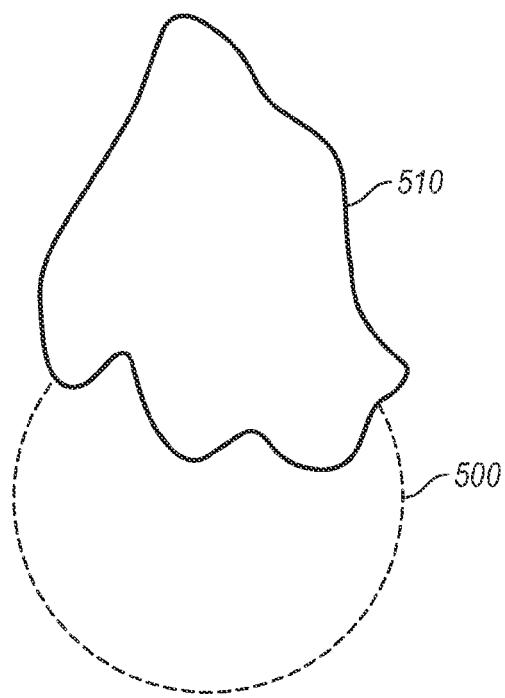
FIG. 11 illustrates an exemplary embodiment of a portable multi-touch skin.

In the embodiments of FIGS. 2, 5 and 10, the one or more multi-touch skins are permanently attached to objects. FIG. 11 illustrates a portable multi-touch skin 510 that can be positioned along three dimensions of an object 500.

Portable multi-touch skin 510 is a flex circuit to which electrodes, traces and sensing circuit are attached. The flex circuit can then be temporarily placed or stretched over object 500. Multi-touch skin 510 can be operatively coupled to a device, such as device 51 in FIG. 2, in order for the user to provide setting information relating to the object to be wrapped. For example, the setting information can indicate that the object is a guitar neck or a globe. The setting information can also provide information relating to the placement of multi-touch skin 510 vis-à-vis object 500. For example, the setting information can indicate around which frets skin 510 is wrapped or where longitude 0° in relation to an edge of skin 510.

Once the setting information is established, the user can input multi-touch events to operate the device as described above with respect to FIGS. 2-10. For example, the user can perform chords on the guitar fret in conjunction with an instructional software on device 51. The player's chords on multi-touch skin 510 can be tracked and then analyzed by the instructional software to determine if the player is properly performing the chords. As an another example, the user can touch two countries on the globe and obtain distance information between the two countries from device 51. It should be noted that all the capabilities described with respect to device 51 can be implemented directly with skin 510.

In performing multi-touch tracking on a multi-touch skin, whether permanent or temporary, an image at given point in time can be taken of the touch event. The image, as described above with respect to FIG. 6, can be converted into a list features for the touch event. Each feature can represent a distinct input such as a touch. As described above with respect to FIG. 4 at block 100 and FIG. 6 as block 304, each feature can include coordinates. For example, as illustrated in FIGS. 7A and 7B, each feature 332A and 332B has an x-coordinate, a y-coordinate, a magnitude Z and so on.

Magnitude Z can represent the capacitance value for a given point or pixel and can be calculated for a given touch. If the current magnitude Z is compared to a past magnitude Z, it can provide an indication of the pressure being applied on the multi-touch skin by the finger touching the skin. For example, an increase in magnitude Z can reflect an increase in the pressure being applied by the finger on the multi-touch skin.

If a finger touches the multi-touch skin firmly on its initial contact, any further pressure being applied by the finger may only be reflected in a marginal increase in magnitude Z. In other words, the measured magnitude Z can exhibit a non-linear response to the pressure being applied to the multi-touch skin. This can make tracking magnitude Z difficult. It can also make performing actions based on a change in magnitude Z difficult.

Figure 12:
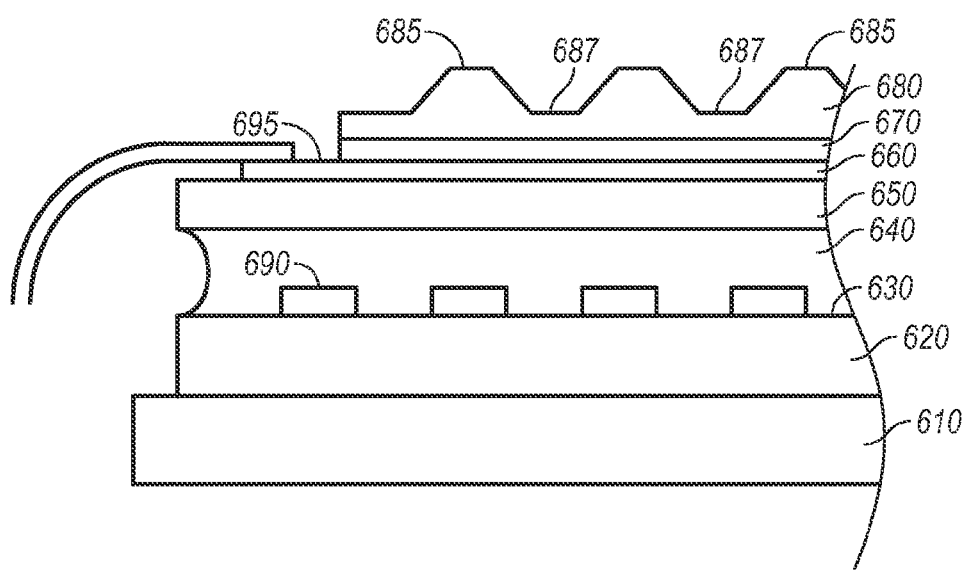
FIG. 12 illustrates an exemplary embodiment of an improved multi-touch skin for measuring the magnitude (Z) of a touch.

FIG. 12 is a partial front elevation view, in cross section of an improved multi-touch skin, in accordance with one embodiment of the present invention, for measuring the magnitude (Z) of a touch. The multi-touch skin of FIG. 12 is a transparent touch screen employing mutual capacitance on a display. Specifically, the illustrated arrangement can include an LCD display 610 and a touch screen positioned over the LCD display 610. The LCD display 610 may correspond to any conventional LCD display known in the art. Although not shown, the LCD display 610 typically can include various layers including a fluorescent panel, polarizing filters, a layer of liquid crystal cells, a color filter and the like.

The touch screen can include a transparent sensing layer 630 that is positioned over a first glass member 620. The sensing layer 630 can include a plurality of sensor lines 690 positioned in columns (extending in and out of the page). The first glass member 620 may be a portion of the LCD display 610 or it may be a portion of the touch screen. For example, it may be the front glass of the LCD display 610 or it may be the bottom glass of the touch screen. The sensing layer 630 can be typically disposed on the glass member 620 using suitable transparent conductive materials and patterning techniques.

In some cases, it may be necessary to coat the sensing layer 630 with material of similar refractive index to improve the visual appearance, i.e., make more uniform.

The touch screen also can include a transparent driving layer 660 that is positioned over a second glass member 650. The second glass member 650 can be positioned over the first glass member 620. The sensing layer 630 is therefore sandwiched between the first and second glass members 620 and 650. The second glass member 650 can provide an insulating layer between the driving and sensing layers 630 and 660. The driving layer 660 can include a plurality of driving lines 695 positioned in rows (extending to the right and left of the page). The driving lines 695 can be configured to intersect or cross the sensing lines 690 positioned in columns in order to form a plurality of capacitive coupling nodes. Like the sensing layer 630, the driving layer 660 can be disposed on the glass member using suitable materials and patterning techniques. Furthermore, in some cases, it may be necessary to coat the driving layer 660 with material of similar refractive index to improve the visual appearance. Although the sensing layer is typically patterned on the first glass member, it should be noted that in some cases it may be alternatively or additionally patterned on the second glass member.

The touch screen also can include a cover sheet 690 disposed over the driving layer 660. The driving layer 660 is therefore sandwiched between the second glass member 650 and cover sheet 690. Cover sheet 690 can serve to protect the under layers.

The cover sheet 690 can be made from any suitable clear material, such as hard plastic. As illustrated in FIG. 12, cover sheet 690 is corrugated. Sections 685 of the cover sheet (extending in and out of the page) are raised, thereby creating valleys 687 (also extending in and out the page). When a finger touches cover sheet 690, the surface contact of the finger steals charge away from the corresponding rows and columns of the touch screen as described above with respect to mutual capacitance. The corrugated surface can limit the amount of charge being stolen, because it limits the surface contact of the finger, i.e., from being placed flush on the surface of the touch screen. Thus, the initial value of magnitude Z for a given touch on a corrugated surface is less than it would be on a flush surface.

As the user presses more firmly, his finger is pressed against the raised and valley sections. This spreads the finger and allows the finger to steal more charge, thereby producing an increase in the value of magnitude Z. The increase will be reflected in view of the initial, lower magnitude Z, thereby providing a more linear response between the pressure of a user's touch and the measured magnitude Z.

It can also be appreciated that cover sheet 690 is not limited to a corrugated surface as illustrated in FIG. 12. Any textured surface that limits initial surface contact and requires additional force to increase surface contact can be used. For example, a surface having an array of dimples can be used.

It can also be appreciated that the cover sheet 690 is not limited to a hard material, such as plastic. It can be a surface that stretches or bends to the touch. For example, cover sheet 690 can be made of rubber. The elasticity provided by the soft rubber can be used to further make the measured magnitude Z closely track the pressure of a user's touch.

It can also be appreciated that the cover sheet 690 is not limited to a transparent cover sheet as illustrated in FIG. 12. The corrugated cover sheet can, for example, be opaque.

It can also be appreciated that magnitude Z as measured can be used to perform actions and enable gestures. As described above with respect to FIGS. 3, 4 and 6, magnitude Z is a coordinate of a touch that can be tracked. For example, a continuously increasing magnitude Z by a thumb on multi-touch skin 240 in FIG. 5 can indicate that the user wishes to quickly change the channels. Remote control 200 can then perform a quick channel change, while multi-touch skin 240 can display a button that is pressed down in one direction to indicate a quick channel change in that direction.

The touch screen can also include various bonding layers 640 and 670. The bonding layers 640 and 670 can bond the glass members 620 and 650 as well as the corrugated cover sheet 690 together to form the laminated structure and to provide rigidity and stiffness to the laminated structure. In essence, the bonding layers 640 and 670 help to produce a monolithic sheet that is stronger than each of the individual layers taken alone. In most cases, the first and second glass members 620 and 650 as well as the second glass member and the protective sheet 650 and 690 can be laminated together using a bonding agent such as glue. The compliant nature of the glue may be used to absorb geometric variations so as to form a singular composite structure with an overall geometry that is desirable. In some cases, the bonding agent includes an index matching material to improve the visual appearance of the touch screen.

With regards to configuration, each of the various layers may be formed with various sizes, shapes, and the like. For example, each of the layers may have the same thickness or a different thickness than the other layers in the structure. In the illustrated embodiment, the first glass member 620 can have a thickness of about 1.1 mm, the second glass member 650 can have a thickness of about 0.4 mm. The thickness of the bonding layers 640 and 670 typically varies in order to produce a laminated structure with a desired height. Furthermore, each of the layers may be formed with various materials. By way of example, each particular type of layer may be formed from the same or different material. For example, any suitable glass or plastic material may be used for the glass members. In a similar manner, any suitable bonding agent may be used for the bonding layers 640 and 670.

Figure 13A:
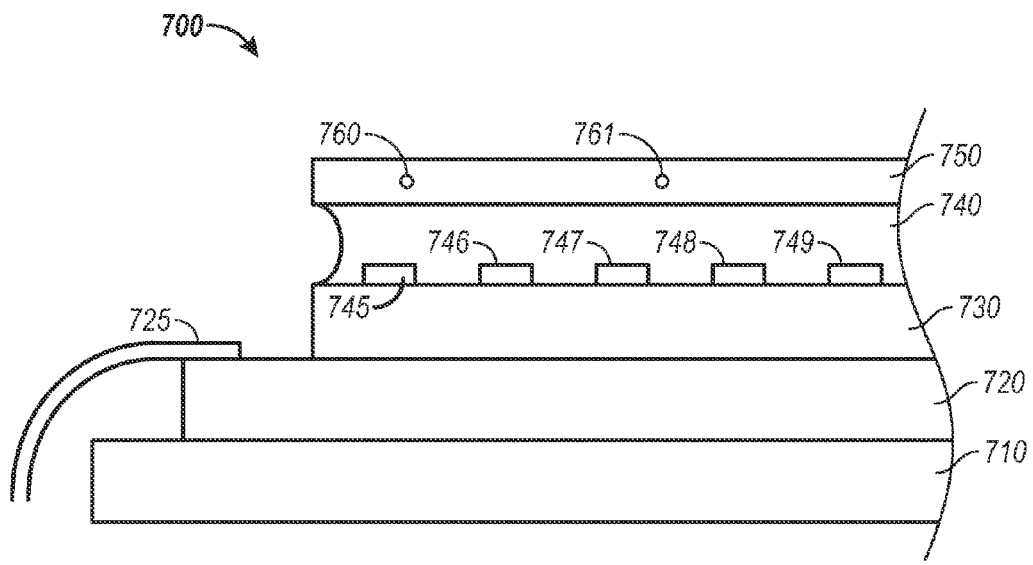
FIGS. 13A and 13B illustrate an exemplary embodiment of a multi-touch skin that can measure the force of a touch in one or more directions.
Figure 13B:
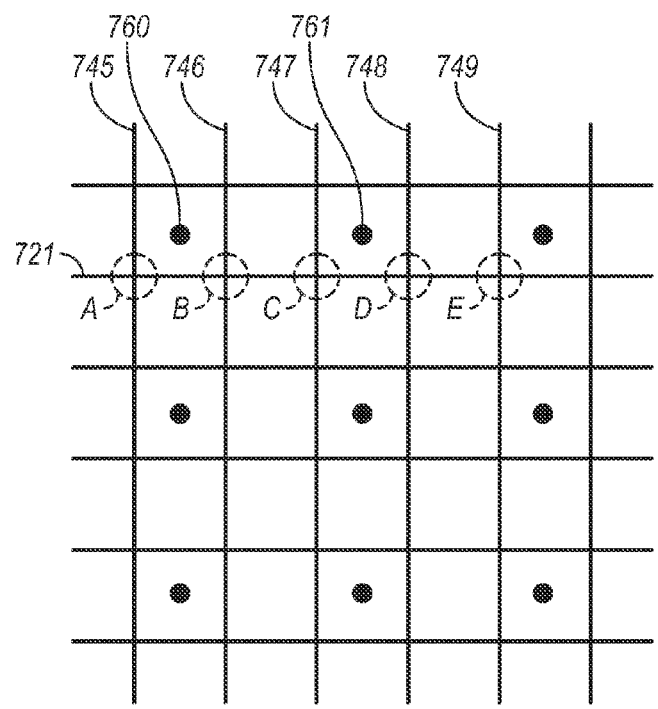

FIGS. 13A and 13B illustrate an exemplary embodiment of a multi-touch skin that can measure not only the magnitude (Z) of a touch, but also the force of the touch in one or more directions, i.e., the x, y and/or z directions. The four types of data can enable a broad vocabulary of gestures.

FIG. 13A is a partial front elevation view, in cross section, of a multi-touch skin 700. Multi-touch skin 700 can include a base member 700 upon which a driving layer 720 is placed. As illustrated in FIG. 13B, driving layer 720 can include a plurality of driving lines, such as driving line 721, positioned to extend from the right and left of the page. Multi-touch skin 700 can also include an insulating member 730 positioned between driving layer 720 and sensing layer 740. Sensing layer 740 can include a plurality of sensor lines 745, 746 and so on as illustrated in FIGS. 13A and 13B. The distance between two adjacent sensor lines can be 2.5 mm.

As illustrated in FIG. 13B, the sensor lines can extend in columns orthogonal to driving lines. The intersection of the sensor lines and driving lines produce sensing nodes. FIG. 13B illustrates sensing nodes A, B, C, D and E corresponding to the intersection of sensing lines 745-749 and driving line 721. Based on this arrangement of sensing nodes, multi-touch skin 700 can perform multi-touch tracking through mutual capacitance as described above.

A cover member 750 can be positioned over sensing layer 750. Cover member 750 can be made of an elastic material, such as soft rubber. Cover member 750 can be opaque, partially transparent or fully transparent depending on the application. Dispersed within cover member 750 can be a plurality of slugs 760, 761 and so on. The slugs can be made of metal and can be positioned between every other sensing line and driving line as illustrated in FIGS. 13A and 13B.

When a user touches cover member 750, cover member 750 can become deformed. Its deformation can change the position of one or more slugs changes in relation to its adjacent sensing and driving lines. For example, in a simple case of a touch in only the x-direction and toward the right of the page, slugs 760 and 761 will be moved to the right of the page. The slugs will be positioned closer to sensing lines 746 and 748 (and nodes B and D) and farther from sensing lines 745 and 747 (and nodes A and C) than in their respective original positions. The change in position of the slugs 760 and 761 can affect the capacitance between the applicable sensing lines and driving lines, between adjacent sensing lines and between adjacent driving lines.

The capacitance at each applicable node can be calculated to provide a measure of the force in the x-direction. For example, the signal reflecting the capacitance values over time at nodes A-E can be analyzed to measure the force in the x-direction. For example, the values for nodes B and D can be added while the values relating to nodes A, C and E can be subtracted as a spatial filter to provide a measure of the force in the x-direction. Other data, such as touch Z between two nodes by adding the signals at the two nodes.

It can be appreciated that the touch being applied to cover member 750 can be in more than just the x-direction. However, the force in the y-direction and the z-direction can be measured by applying the same approach to the nodes affected by the movement of the slugs in the y and z-direction.

Multi-touch skin 700 can accordingly be capable of providing four types of image data, i.e., magnitude Z and force data relating to one or more directions. Such data can be used to enable a broad vocabulary of actions and gestures. For example, any device that any form of velocity or steering control in a device, such as joystick or steering wheel, can be achieved with multi-touch skin 700. As another, example, with respect to the exemplary embodiment of remote control 200 in FIG. 5, a user may be faced with selecting a program through a matrix of channels (in rows) and times (in columns) displayed on a television. The user can roll his thumb on multi-touch skin 240 to move along a row of the matrix, e.g., a given channel. Multi-touch skin 240 can measure not only the direction of the roll, e.g., in the x-direction and to the right, but also the force of the roll in the x-direction. Such data can be used to control how fast the user scrolls along the row of the matrix, with a greater force providing a faster scroll. It can be appreciated that vocabulary of action and gestures is not limited to such gestures or devices.

It can also be appreciated that the distribution of slugs may be widely varied. For example, if the sensing and driving lines are positioned in an array of concentric and radial segments, the slug 760 can also be distributed in along concentric and radial segments. It can also be appreciated that the distribution of slugs can be random or based on a particular pattern.

It can also be appreciated that the measure of the force in the x, y and/or z-directions can be achieved in ways other than as illustrated in FIGS. 13A and 13B. For example, rubber cilia as opposed to a rubber cover with slugs can be used to achieve differences in capacitance between adjacent rows, adjacent columns and overlapping rows and columns as the cilia is pushed in a given direction.

Many alterations and modifications can be made by those having ordinary skill in the art without departing from the spirit and scope of the invention. Therefore, it must be understood that the illustrated embodiments have been set forth only for the purposes of example and that they should not be taken as limiting the invention as defined by the following claims. For instance, although many of the embodiments of the invention are described herein with respect to personal computing devices, it should be understood that the present invention is not limited to desktop or laptop computers, but is generally applicable to other computing applications such as mobile communication devices, standalone multimedia reproduction devices, etc.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements can be made for any one of the elements in the claims below or that a single element can be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined claim elements.

The claims are thus to be understood to include what is specifically illustrated and described above, what is conceptually equivalent, and what can be obviously substituted. For instance, the term "computer" or "computer system" as recited in the claims shall be inclusive of at least a desktop computer, a laptop computer, or any mobile computing device such as a mobile communication device (e.g., a cellular or Wi-Fi/Skype phone, e-mail communication devices, personal digital assistant devices), and multimedia reproduction devices (e.g., iPod, MP3 players, or any digital graphics/photo reproducing devices).

What is claimed is:

1. A capacitive touch sensing device comprising:
 a flexible touch sensing circuit with a first surface and a second surface opposite to the first surface, the flexible touch sensing circuit including a flexible dielectric film and an array of capacitance sensing nodes, the array including a plurality of conductive lines, the flexible dielectric film and the array of capacitance sensing nodes being disposed between the first surface and the second surface, the flexible touch sensing circuit being deformable into a plurality of different three-dimensional shapes such that the second surface is conformable to each of the plurality of different three-dimensional shapes while the flexible touch sensing circuit senses multiple touch events occurring at different locations on the first surface.

2. The capacitive touch sensing device of claim 1 wherein the flexible touch sensing circuit includes an electrically isolated electrode at each capacitance sensing node, each electrode electrically connected to an individual one of the conductive lines for operatively coupling to capacitive monitoring circuitry.

3. The capacitive touch sensing device of claim 2, further comprising:
   the capacitive monitoring circuitry, wherein the capacitive monitoring circuitry includes one or more integrated circuits for monitoring the capacitance at each of the electrodes.

4. The capacitive touch sensing device of claim 3, further comprising:
   a processing device that detects the multiple touch events occurring on the first surface of the flexible touch sensing circuit, the multiple touch events being detected based on capacitance information received from the capacitive monitoring circuitry.

5. The capacitive touch sensing device of claim 1 wherein the capacitance sensing nodes are arranged in an orthogonal grid.

6. The capacitive touch sensing device of claim 1 wherein the flexible touch sensing circuit is opaque.

7. The capacitive touch sensing device of claim 1, further comprising:
   an object including a processing device, wherein the second surface of the flexible touch sensing circuit is attached to one or more surfaces of the object, and the processing device detects the multiple touch events occurring on the first surface.

8. The capacitive touch sensing device of claim 7 wherein the object is a handheld electronics device, and the processing device further generates input commands of the handheld electronics device, the input commands being generated based on the detected touch events.

9. The capacitive touch sensing device of claim 8 wherein the handheld electronics device is a remote control, a computer, a mobile telephone or a digital media player.

10. The capacitive touch sensing device of claim 7 wherein the object is a musical instrument.

11. The capacitive touch sensing device of claim 7 wherein the object is a handle of a sporting device.

12. The capacitive touch sensing device of claim 1, wherein a distance between the first and second surfaces is 0.1 mm or less.

13. The capacitive touch sensing device of claim 1, wherein the flexible touch sensing circuit is substantially transparent.

14. The capacitive touch sensing device of claim 13, wherein the conductive lines include indium tin oxide (ITO).

15. The capacitive touch sensing device of claim 1, wherein the conductive lines include a first set of conductive lines disposed a first layer and a second set of conductive lines disposed in a second layer, the first and second layers being spatially separated from each other, the first set of conductive lines arranged along a first direction and the second set of conductive lines arranged along a second direction different than the first direction, such that first and second sets of conductive lines overlap at a plurality of locations, wherein each overlap is one of the capacitance sensing nodes.

16. The capacitive touch sensing device of claim 15, wherein the first direction is orthogonal to the second direction.

17. The capacitive touch sensing device of claim 7, wherein the one or more surfaces of the object includes a planar surface.

18. The capacitive touch sensing device of claim 7, wherein the processing device further determines an arrangement of the detected multiple touch events, compares the determined arrangement to a predetermined arrangement, and generates feedback information based on the comparison.

19. The capacitive touch sensing device of claim 18, wherein the object is a sporting device, the predetermined arrangement is a predetermined grip arrangement of the sporting device, and the feedback information indicates whether or not the determined arrangement matches the predetermined grip arrangement.

20. The capacitive touch sensing device of claim 8, further comprising:
   a display screen that displays graphical user interface (GUI) objects, wherein the input commands generated by the processing device are further based on the GUI objects.

* * * * *